United States Patent
Choi et al.

(10) Patent No.: US 9,612,470 B2
(45) Date of Patent: Apr. 4, 2017

(54) DISPLAY WITH COLUMN SPACER STRUCTURES

(71) Applicant: Apple Inc., Cupertino, CA (US)

(72) Inventors: Sang Un Choi, San Jose, CA (US);
Zhibing Ge, Sunnyvale, CA (US);
Shang-Chih Lin, Los Altos, CA (US);
Hiroshi Osawa, Sunnyvale, CA (US);
Ton-Yong Wang, Fremont, CA (US);
Ming Xu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/473,342

(22) Filed: Aug. 29, 2014

(65) Prior Publication Data

US 2015/0198844 A1 Jul. 16, 2015

Related U.S. Application Data

(60) Provisional application No. 61/925,999, filed on Jan. 10, 2014.

(51) Int. Cl.
| | |
|---|---|
| *G02F 1/13* | (2006.01) |
| *G02F 1/1335* | (2006.01) |
| *G02F 1/1339* | (2006.01) |
| *G02B 5/20* | (2006.01) |

(52) U.S. Cl.
CPC ....... *G02F 1/133514* (2013.01); *G02B 5/201* (2013.01); *G02F 1/13394* (2013.01); *G02F 1/133512* (2013.01); *G02F 1/133516* (2013.01); *G02F 2001/13398* (2013.01); *G02F 2001/133519* (2013.01)

(58) Field of Classification Search
CPC ........ G02F 2001/133519–2001/133521; G02F 1/133514–1/133516
See application file for complete search history.

(56) References Cited

U.S. PATENT DOCUMENTS

| | | |
|---|---|---|
| 8,026,999 B2 | 9/2011 | Shi |
| 8,314,917 B2 | 11/2012 | Hwang et al. |
| 8,760,595 B2 | 6/2014 | Choi et al. |

(Continued)

FOREIGN PATENT DOCUMENTS

| | | |
|---|---|---|
| CN | 1752828 A | 3/2006 |
| CN | 1797117 A | 7/2006 |

(Continued)

*Primary Examiner* — Mariceli Santiago

(74) *Attorney, Agent, or Firm* — Treyz Law Group, P.C.; Kendall W. Abbasi

(57) ABSTRACT

A display may have a layer of liquid crystal material between a color filter layer and a thin-film transistor layer. Column spacer structures may be formed between the color filter layer and the thin-film transistor layer to maintain a desired separation between the color filter and thin-film transistor layers. Column spacers may be deposited in column spacer regions of the color filter layer. The color filter layer may include rows of red, green, and blue color filter elements. Blue color filter material that forms blue color filter elements in the color filter layer may also be used to form a planar surface over red and green color filter elements in the column spacer regions. Using the blue color filter material to planarize the surface on which column spacers are formed ensures that the column spacers provide sufficient support for the display without requiring an additional planarization layer.

17 Claims, 12 Drawing Sheets

(56) References Cited

U.S. PATENT DOCUMENTS

| | | |
|---|---|---|
| 2008/0187870 A1 | 8/2008 | Shin et al. |
| 2011/0156039 A1 | 6/2011 | Baek et al. |
| 2013/0016293 A1 | 1/2013 | Cho et al. |

FOREIGN PATENT DOCUMENTS

| | | |
|---|---|---|
| CN | 204360059 U | 5/2015 |
| JP | 1997236704 | 9/1997 |
| JP | 2009069522 | 4/2009 |
| JP | 201117751 | 1/2011 |
| KR | 93-005560 | 6/1993 |
| KR | 1020110077368 | 7/2011 |

DISPLAY WITH COLUMN SPACER STRUCTURES

This application claims the benefit of provisional patent application No. 61/925,999, filed Jan. 10, 2014, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Display pixels in a liquid crystal display contain thin-film transistors and electrodes for applying electric fields to the liquid crystal material. The strength of the electric field in a display pixel controls the polarization state of the liquid crystal material and thereby adjusts the brightness of the display pixel.

Substrate layers such as color filter layers and thin-film transistor layers are used in liquid crystal displays. The thin-film transistor layer contains an array of the thin-film transistors that are used in controlling electric fields in the liquid crystal layer. The color filter layer contains an array of color filter elements such as red, blue, and green elements. The color filter layer provides the display with the ability to display color images.

In an assembled display, the layer of liquid crystal material is sandwiched between the thin-film transistor layer and the color filter layer. Polyimide passivation layers cover the inner surface of the color filter layer and the upper surface of the thin-film transistor layer. An array of column spacers is formed on the inner surface of the color filter layer to maintain a desired gap between the color filter layer and the thin-film transistor layer. Column spacers are typically formed from hard organic materials such as photoresist.

There are tradeoffs involved in designing an appropriate column spacer arrangement for a display. If the column spacers do not provide sufficient support for a display, the display may be susceptible to an undesirable visual effect called pooling mura. On the other hand, column spacer designs that cause a display to become overly rigid will make the display prone to stress-induced birefringence when deformed, leading to undesired light leakage effects.

In order to provide sufficient support for a display, care must be taken to ensure that the column spacers are deposited on a flat surface. In a typical configuration, an array of red, green, and blue color filter elements are deposited on an inner surface of a color filter substrate. An array of column spacers is then formed over the array of color filter elements. Because the color filter elements have varying heights with respect to the inner surface of the color filter substrate, a transparent planarization layer is formed over the color filter array prior to forming the column spacer array.

The varying step height between red, green, and blue color filter elements requires a thick transparent overcoat layer in order to form a planar surface over the color filter array. This type of thick overcoat layer can cause display colors to appear washed out to a user.

It would therefore be desirable to be able to provide a display with an improved column spacer configuration.

SUMMARY

A display may have a color filter layer with opposing upper and lower surfaces and a thin-film transistor layer with opposing upper and lower surfaces. A layer of liquid crystal material may be located between the lower surface of the color filter layer and the upper surface of the thin-film transistor layer.

Column spacer structures may be formed between the color filter layer and the thin-film transistor layer to maintain a desired separation between the color filter layer and the thin-film transistor layer. The column spacer structures may be formed from polymer structures such as photoresist pillars and may include pads such as metal pads. The metal pads may be formed on the upper surface of the thin-film transistor layer or the lower surface of the color filter layer. The photoresist pillars may be formed on a surface in the display such as the lower surface of the color filter layer.

The color filter layer may include a color filter array having rows of red, green, and blue color filter elements formed on a color filter substrate. Each color filter element may overlap a corresponding light-transmitting region through which light exits the display. There may be multiple rows of light-transmitting regions corresponding to respective rows of display pixels. The rows of light-transmitting regions may be separated from each other by column spacer regions on which column spacers may be formed.

Blue color filter material that forms blue color filter elements in the color filter layer may also be used to form a planar surface over red and green color filter elements in the column spacer regions. Using the blue color filter material to planarize the surface on which column spacers are formed ensures that the column spacers are able to provide sufficient support for the display without requiring an additional planarization layer.

The blue color filter material may include lines of blue color filter material interposed between adjacent rows of light-transmitting regions. A column spacer may be formed on a portion of the blue color filter material that overlaps a boundary between two adjacent color filter elements. The lines of blue color filter material may be wider in portions that overlap a boundary between two color filter elements than in portions that do not overlap a boundary.

A grid of opaque masking material having an array of openings may be formed on the color filter substrate. Each opening may correspond to an associated light-transmitting region and may overlap a corresponding color filter element. Lines of opaque masking material in the grid may overlap the lines of blue color filter material on which column spacers are formed.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, 3, and 4.

Figure 1:
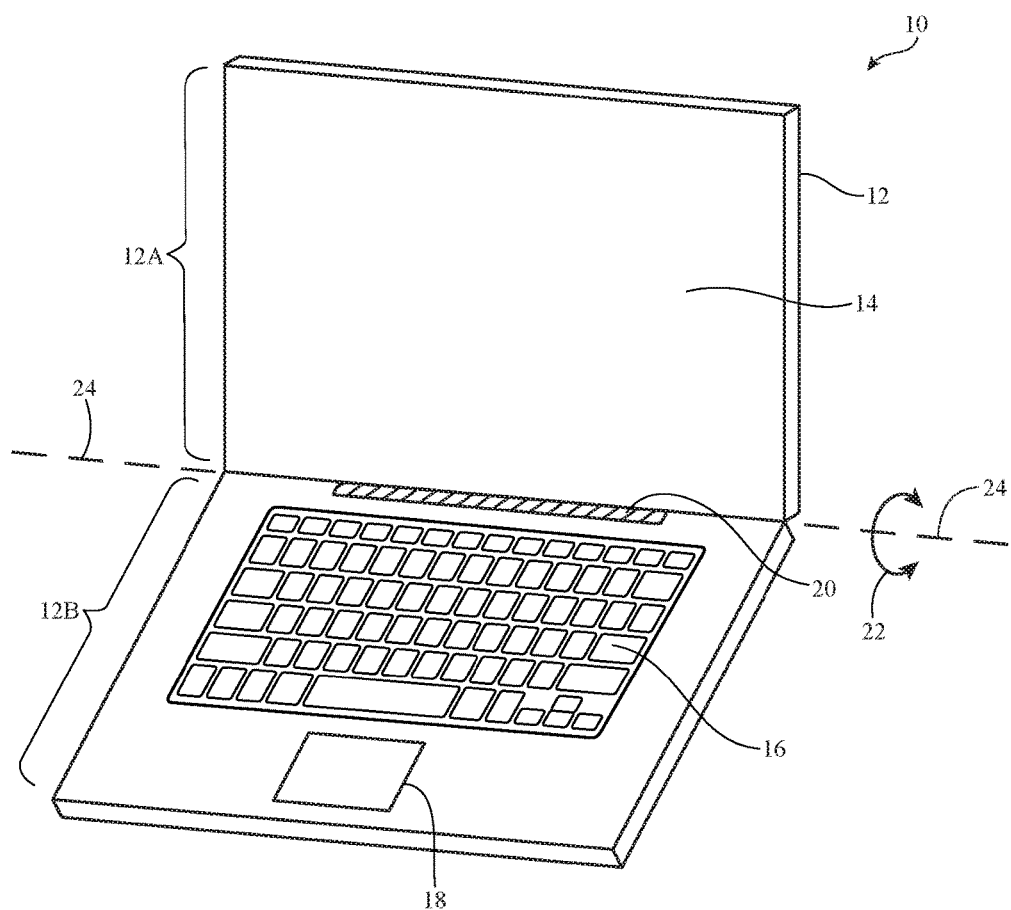
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
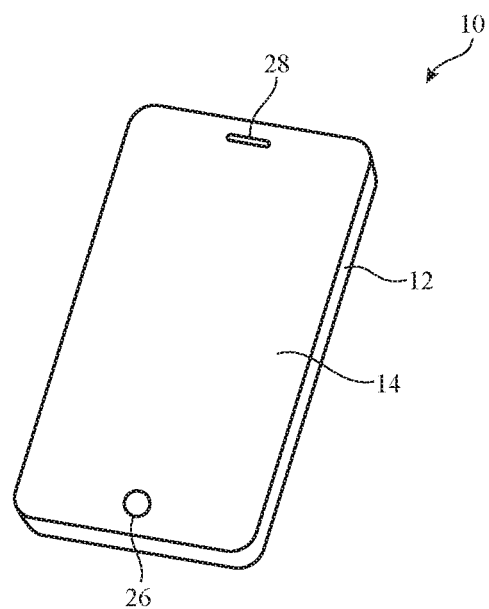
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
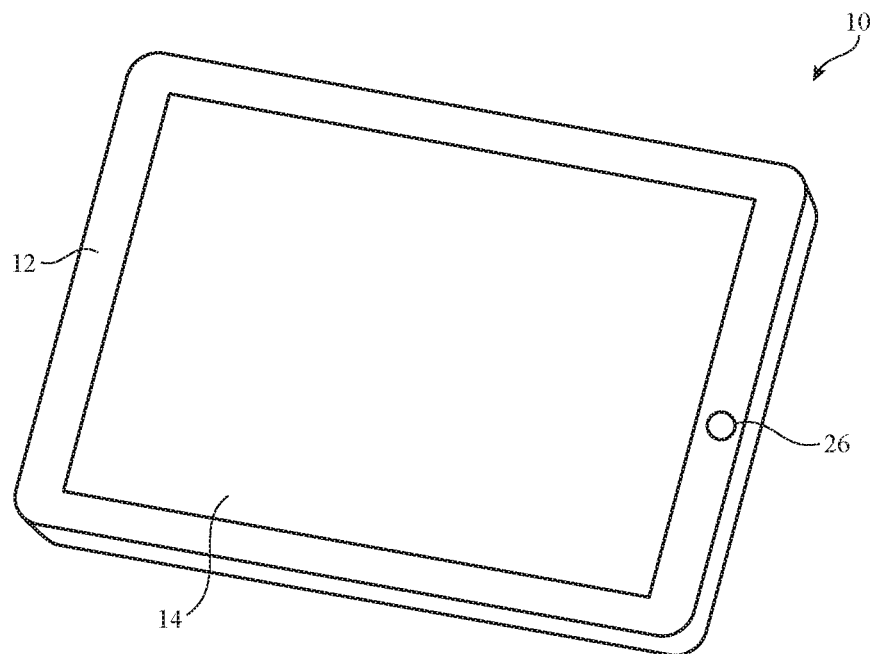
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
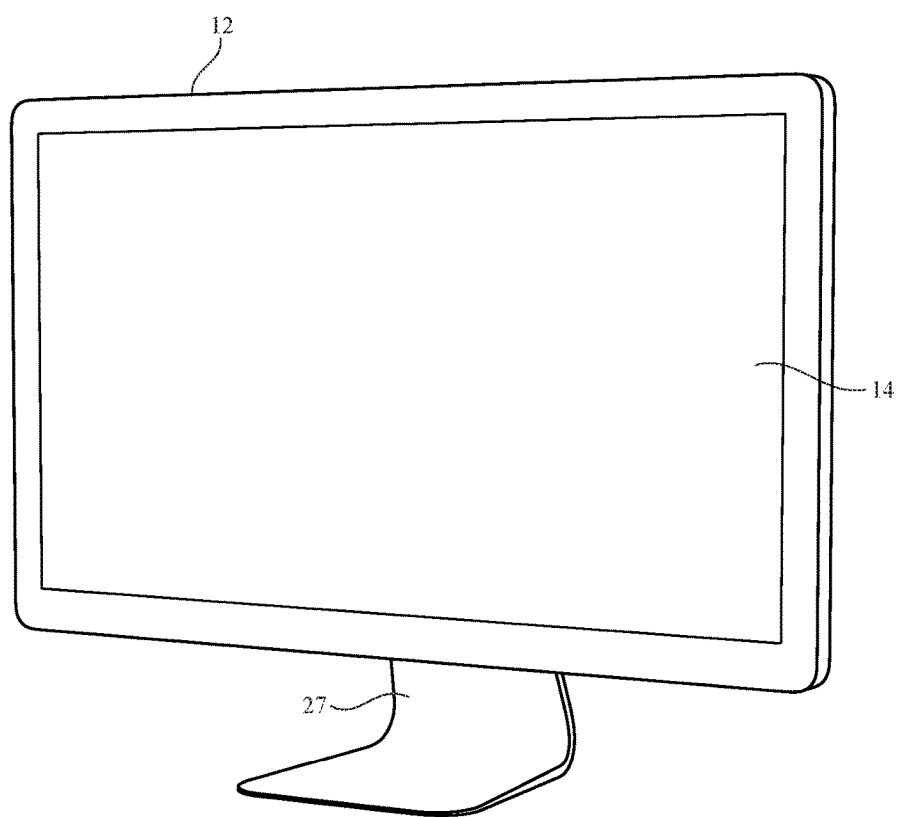
FIG. 4 is a perspective view of an illustrative electronic device such as a computer display with display structures in accordance with an embodiment of the present invention.

FIG. 4 shows how electronic device 10 may be a computer display or a computer that has been integrated into a computer display. With this type of arrangement, housing 12 for device 10 may be mounted on a support structure such as stand 27. Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
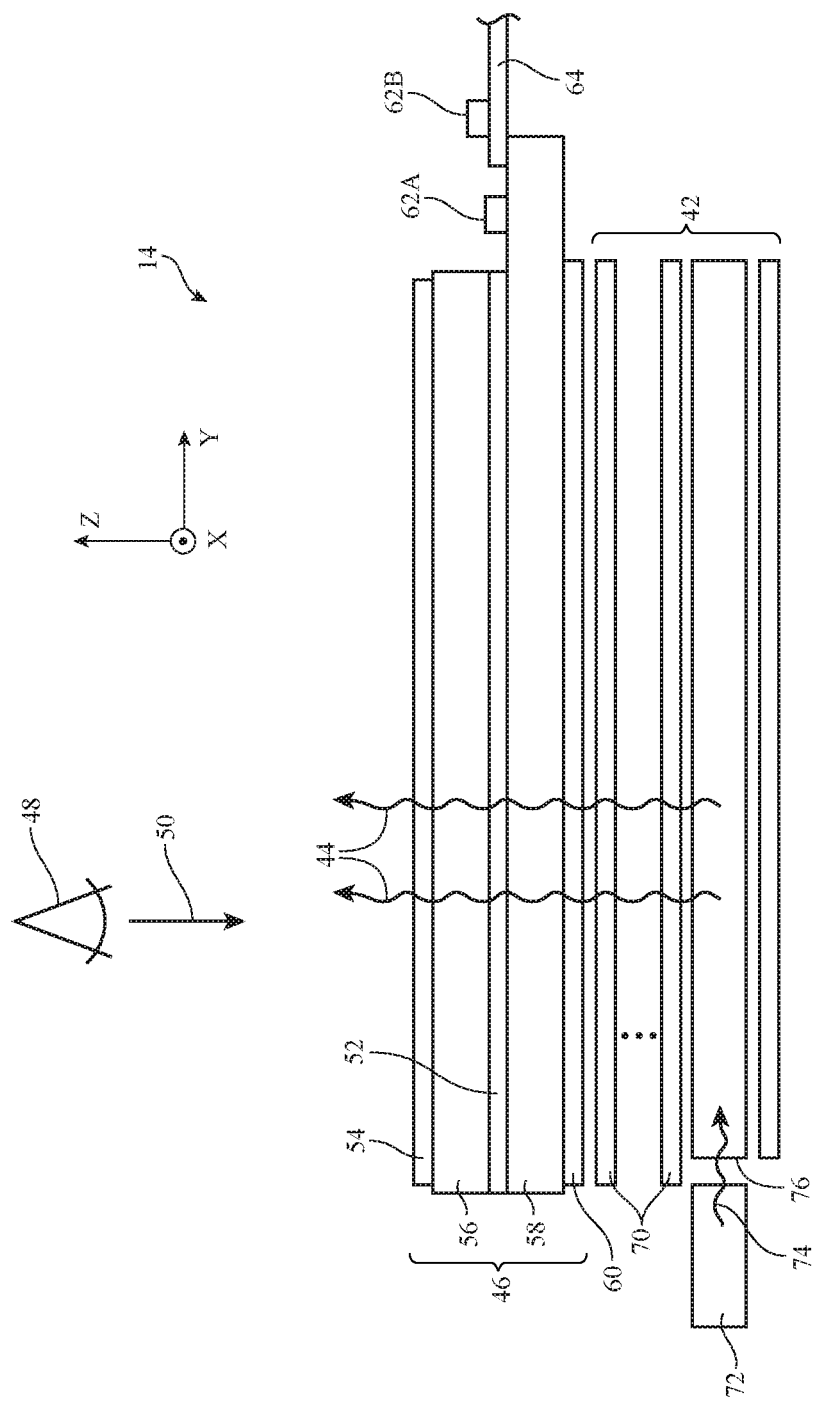
FIG. 5 is a cross-sectional side view of an illustrative display in accordance with an embodiment of the present invention.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

To maintain a desired gap for the liquid crystal material between the lower surface of color filter layer 56 and the upper surface of thin-film transistor layer 58, display 14 may be provided with column spacer structures (sometimes referred to as post spacers or photo spacers). The column spacer structures may be formed from column structures (e.g., cylindrical posts) and/or planar structures such as metal pads on the surfaces of color filter layer 56 and/or thin-film transistor layer 58.

Figure 6:
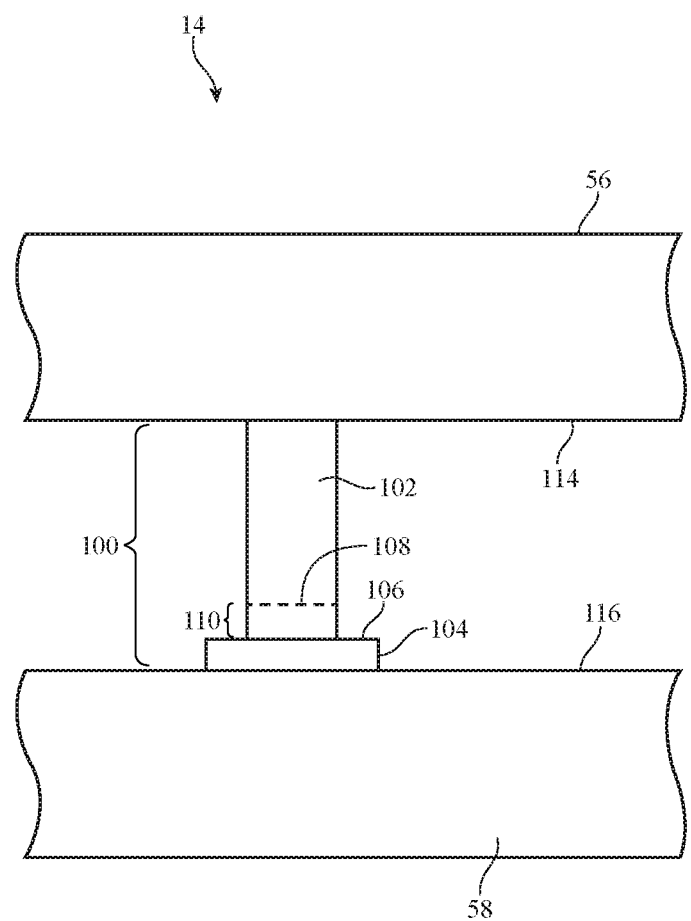
FIG. 6 is a cross-sectional side view of a portion of a display with a main column spacer that is supported by a landing pad on a thin-film transistor layer in accordance with an embodiment of the present invention.

FIG. 6 is a cross-sectional side view of a portion of display 14 showing an illustrative column spacer arrangement. In the example of FIG. 6, column spacer structures 100 extend between lower (innermost) surface 114 of color filter layer 56 and upper (outermost) surface 116 of thin-film transistor layer 58.

Column spacer structures 100 of FIG. 6 include column spacer 102 and landing pad 104. Column spacer structures such as column spacer 102 and other column spacers in display 14 may be formed from photoresist, other polymers, or non-polymer materials. Photolithographic fabrication techniques may be used to pattern column spacers on layers such as color filter layer 56. Landing pad 104 may be formed from an organic or inorganic material. As an example, landing pad 104 may be formed from metal. Both the thickness (vertical height in dimension Z) of landing pad 104 on surface 116 of thin-film transistor layer 58 and the thickness of column spacer 102 contribute to the total thickness of column spacer structures 100. If desired, column spacer 102 may extend only to position 108 so that a gap such as gap 110 may be formed between the lower surface of column spacer 102 of column spacer structures 100 and upper surface 106 of pad 104.

Figure 7:
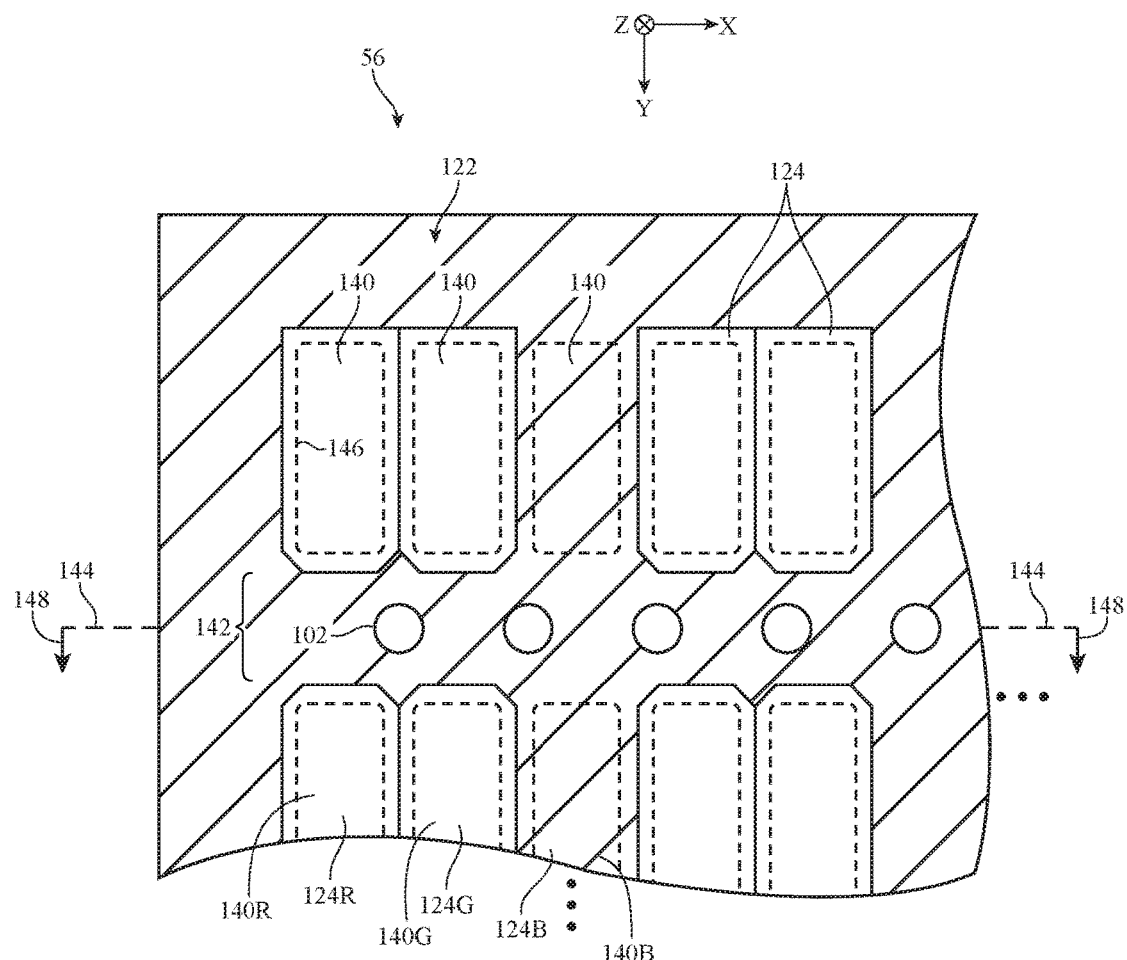
FIG. 7 is a bottom view of an illustrative color filter layer showing how column spacers may be formed on a planar surface of blue color filter material in accordance with an embodiment of the present invention.

FIG. 7 is a bottom view of color filter layer 56 showing an illustrative arrangement for column spacers 102. Color filter layer 56 may include a color filter array such as color filter element array 122. Color filter array 122 may include an array of color filter elements such as color filter elements 124. Color filter elements 124 may, for example, include red color filter elements 124R, green color filter elements 124G, and blue color filter elements 124B. Color filter elements 124 may be formed from colored polymers or resins (e.g., red, green, and blue photoresist material).

Each color filter element 124 may overlap a corresponding pixel region 140. Pixel regions 140 (i.e., regions 140 within dotted lines 146) may each correspond to (i.e., may overlap) a given display pixel in display 14. Each pixel region 140 may transmit light in the Z direction to the exterior of the display. In other words, display light that is transmitted by liquid crystal layer 52 (FIG. 5) may exit the display via pixel regions 140 and color filter elements 124. Color filter elements 124 may impart color to the light that is transmitted through pixel regions 140. For example, light that is transmitted through pixel regions 140R may be red light, light that is transmitted through pixel regions 140G may be green light, and light that is transmitted through pixel regions 140B may be blue light.

A grid of opaque masking material (sometimes referred to as a black matrix) may be formed under color filter elements 124. The black matrix may include a grid of crisscrossing lines. Pixel regions 140 of color filter layer 56 may be free of opaque masking material, whereas some or all of the portions outside of pixel regions 140 may include a layer of opaque masking material. The grid of opaque masking material may be used to hide from view control lines and thin-film transistor circuitry on thin-film transistor layer 58 (FIG. 5). The opaque masking material may also be used to separate color filter elements 124 to prevent color mixing and light leakage.

As shown in FIG. 7, column spacers 102 may be located on portions of color filter layer 56 that lie outside of pixel regions 140 such as column spacer regions 142. In the illustrative example of FIG. 7, column spacers 102 are disposed in rows that run parallel to rows of pixels regions 140 (e.g., parallel to the X axis of FIG. 7). Each row of column spacers 102 may be interposed between an adjacent pair of rows of pixel regions 140.

There may be any suitable number of rows of column spacers 102 on color filter layer 56. For example, there may be one row of column spacers 102 for every row of pixel regions 140, for every two rows of pixel regions 140, for every three rows of pixel regions 140, etc. Each row of column spacers 102 may include one column spacer for every pixel region 140, for every two pixel regions 140, for every three pixel regions 140, etc.

To ensure that column spacers 102 are formed on a flat surface without requiring a thick overcoat layer, the last color filter material to be deposited on color filter layer 56 may also be used to planarize the surface of color filter layer 56. For example, after red color filter material is deposited and patterned to form red color filter elements 124R, and after green color filter material is deposited and patterned to form green color filter elements 124G, blue color filter material may be deposited and patterned to form blue color filter elements 124B and to form single-color rows in region 142 in between rows of pixel regions 140.

In the illustrative example of FIG. 7, blue color filter material (indicated by the shaded regions of FIG. 7) covers the surface of color filter layer 56 except in regions over color filter elements 124R and 124G that overlap pixel regions 140. This is, however, merely illustrative. If desired, blue color filter material may be located only in blue pixel regions 140B and in regions 142 that lie between rows of pixel regions 140.

By using the blue color filter material as a planarization layer, rather than using a fourth transparent material as a planarization layer, the height of the planarization layer relative to the surface of the color filter substrate may be reduced, thereby minimizing display color wash-out that can result from a thick planarization layer.

Figure 8:
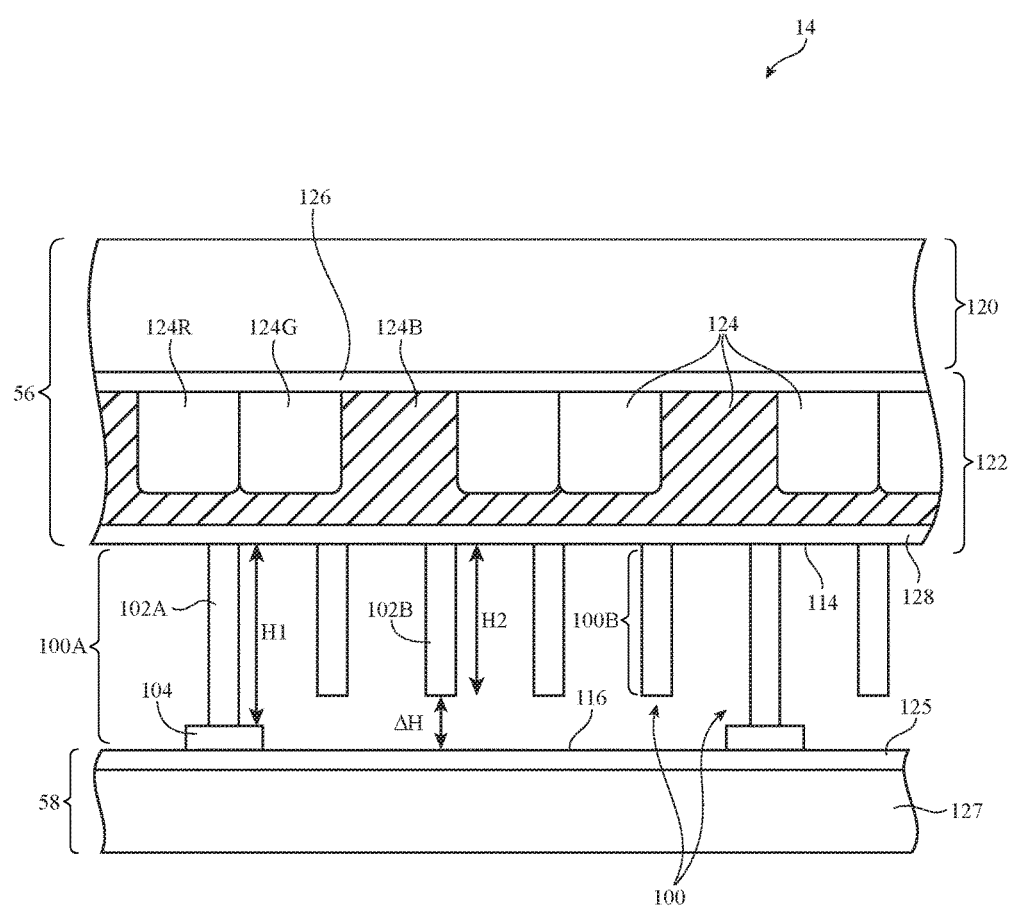
FIG. 8 is a cross-sectional side view of a portion of a display with an array of column spacers formed on a planar surface of blue color filter material in accordance with an embodiment of the present invention.

FIG. 8 is cross-sectional side view of a portion of display 14, showing a cross-section of color filter layer 56 of FIG. 7 taken along line 144 and viewed in direction 148. As shown in FIG. 8, there may be different types of column spacer structures between color filter layer 56 and thin-film transistor layer 58. Color filter layer 56 may include substrate 120 and color filter element array 122. Substrate 120 may be formed from a transparent planar member such as a clear layer of glass or plastic. Color filter array 122 may be formed on the lower surface of substrate 120. Color filter array 122 may contain an array of color filter elements 124 and a grid of opaque masking lines such as masking lines 126.

An optional covering layer such as overcoat layer 128 may be formed over color filter array 122. Overcoat layer 128 may be formed from clear material (e.g., transparent polymer material). Thin-film transistor layer 58 may be formed from a layer of thin-film transistor circuitry 125 (e.g., transistors formed from thin film layers, electrodes, patterned signal lines, capacitors, and other display pixel array circuitry). Thin-film transistor circuitry 125 may be formed on thin-film transistor substrate 127. Substrate 127 may be a layer of clear glass, plastic, or other material. Coatings (e.g., polymer coating layers) may be formed on the surfaces of color filter layer 56 and thin-film transistor layer 58 (e.g., coatings that cover pad structures on these surfaces).

Column spacer structures 100 may be formed by depositing column spacers on surface 114 of color filter layer 56 such as column spacers 102A and 102B. One or more masks (e.g., binary masks, halftone masks, and/or grayscale masks) may be used in forming photoresist pillars (column spacers) of different thicknesses. Landing pads such as landing pad 104 and other pad structures may overlap column spacers such as column spacer 102A and may be used to prevent scratches in the surfaces of the display layers and/or to make desired thickness adjustments in the column spacer structures. Metal or other materials may be used in forming pads.

In display 14, there are generally numerous column spacer structures such as column spacer structures 100A and numerous column spacer structures such as column spacer structures 100B, and structures 100A and 100B are generally distributed uniformly across the surface of display 14.

Column spacers 102A and 102B have different thicknesses (sometimes referred to as heights). For example, column spacer 102A of FIG. 8 may have a thickness (height) H1, and column spacer 102B of FIG. 8 may have a thickness (height) H2. The values of H1 and H2 may be different (as an example).

Column spacer structures 100A may sometimes be referred to as main column spacer structures (or main column spacers). As shown in FIG. 8, main column spacer structures 100A extend between lower surface 114 of color filter layer 56 and upper surface 116 of thin-film transistor layer 58, so that there is no gap in the column spacer structures. The main column spacer structures 100A therefore define the separation distance between color filter layer 56 and thin-film transistor layer 58 in which liquid crystal material 52 is placed.

Column spacer structures 100B do not extend all the way between surface 114 on color filter layer 56 and surface 116 on thin-film transistor layer 58 and are therefore sometimes referred to as subspacers. As shown in FIG. 8, column subspacer structures 100B are free of metal pads such as pad 104. There is a gap ΔH between subspacer column spacer 102B and upper surface 116 of thin-film transistor layer 58. In conditions in which the temperature of liquid crystal material 52 (FIG. 5) changes, color filter layer 56 may deform towards thin-film transistor layer 58. Color filter layer 56 may also be deformed towards thin-film transistor layer 58 when pressure is applied to color filter layer 56. In situations such as these, gap ΔH temporarily disappears because the lower surface of column spacer 102B comes into contact with surface 116 of thin-film transistor layer. The presence of column spacer structures 100B is therefore used to arrest motion of color filter layer 56 to prevent color filter layer 56 and thin-film transistor layer 58 from contacting one another during use of display 14.

The use of main spacers such as main column spacer structures 100A and subspacers such as column subspacer structures 100B is merely illustrative. If desired, column spacer structures 100 may also include intermediate subspacers having a thickness or height between H1 of main column spacers 102 and H2 of subspacers 102B. In general, display 14 may include an array of column spacers having any suitable combination of heights. Some column spacers structures may include landing pads such as landing pad 104 while other column spacer structures may include a gap such as gap ΔH between the column spacer and the upper surface of thin-film transistor layer 58.

Color filter array 122 may include red color filter elements 124R, green color filter elements 124G, and blue color filter elements 124B. As shown in FIG. 8, blue color filter material 124B (indicated by the shaded area of FIG. 8) may cover red and green color filter elements in region 142 (FIG. 7) to form a layer of blue color filter material having a planar surface on which column spacers 102 may be formed. The planar surface of blue color filter material 124B may be located between rows of light-transmitting pixel regions 140 (FIG. 7).

If desired, transparent overcoat layer 128 may be deposited over color filter array 122. Because the surface of blue color filter material 124B on which column spacers 102 are formed is already planar, the thickness of overcoat layer 128 may be minimized.

Figure 9:
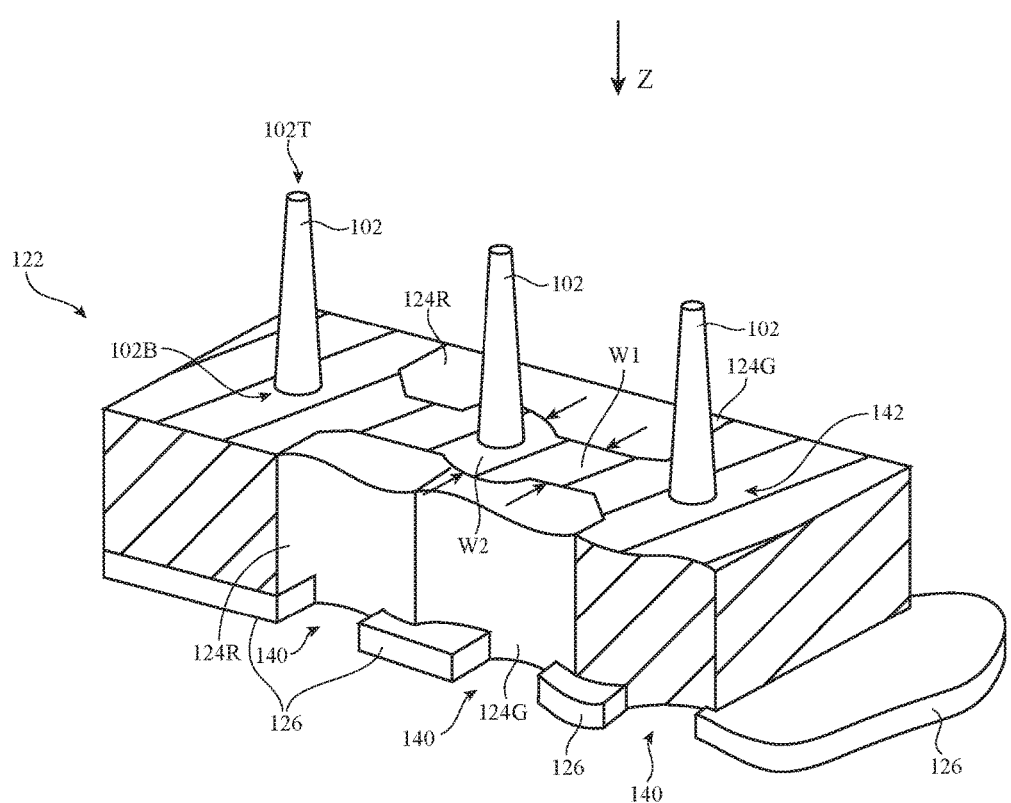
FIG. 9 is a perspective view of a portion of a color filter array in which lines of blue color filter material form a planar surface to accommodate column spacers in between rows of light-transmitting regions in accordance with an embodiment of the present invention.

FIG. 9 is a perspective view of a portion of color filter array 122. As shown in FIG. 9, opaque masking material 126 may have an array of openings, each corresponding to a respective pixel region 140 through which light is transmitted. Light may travel in direction Z through a respective one of color filter elements 124R, 124G, and 124B before passing through pixel regions 140 to exit the display.

In regions 142 between rows of pixel regions 140, lines of opaque masking material 126 may be used to hide control lines and thin-film transistor circuitry on thin-film transistor layer 58 (FIG. 8) from view. Because light is not transmitted through the opaque masking material in regions 142, regions 142 provide acceptable locations on which to form column spacers 102.

To provide a planar surface for column spacers 102 in regions 142 without requiring a thick overcoat layer (e.g., without requiring overcoat layer 128 of FIG. 8 to be excessively thick), blue color filter material 124B may be deposited over red color filter material 124R and green color filter material 124G in regions 142 to form a flat surface (e.g., a surface that is parallel or substantially parallel to the surface of color filter substrate 120 of FIG. 8).

If desired, the lines of blue color filter material 124B that are formed over red and green color filter material in regions 142 (i.e., the lines of blue color filter material that are connected between blue color filter elements) may have varying widths in order to accommodate column spacers 102. For example, as shown in FIG. 9, regions of blue material 124B on which column spacers 102 are located may have a width W2 that is larger than the width W1 of regions without column spacers 102.

If desired, column spacers 102 may have a tapered shape. For example, base surface 102B of column spacer 102 that rests on color filter material 124 may be larger than opposing tip surface 102T of column spacer 102 (i.e., the width or diameter of column spacer 102 may be larger at the base than at the tip). This is, however, merely illustrative. If desired, tip surface 102T may be larger than base surface 102B (i.e., the width or diameter or column spacer 102 may be larger at the tip than at the base), or column spacers 102 may have uniform width or uniform diameter from base 102B to tip 102T.

As shown in FIG. 9, column spacers 102 may be formed in locations that overlap a boundary or interface between two color filter elements (e.g., column spacers 102 may have one portion overlapping a first color filter element and a second portion overlapping a second color filter element). Forming column spacer 102 over a boundary between two adjacent color filter elements may ensure that the widened portions of blue color filter material do not overlap light-transmitting regions 140.

The examples of FIGS. 7, 8, and 9 in which blue color filter material 124B forms a solid contiguous line in region 142 is merely illustrative. If desired, blue color filter material 124B may extend only partially onto an adjacent color filter in region 142. This type of arrangement is shown in FIG. 10.

Figure 10:
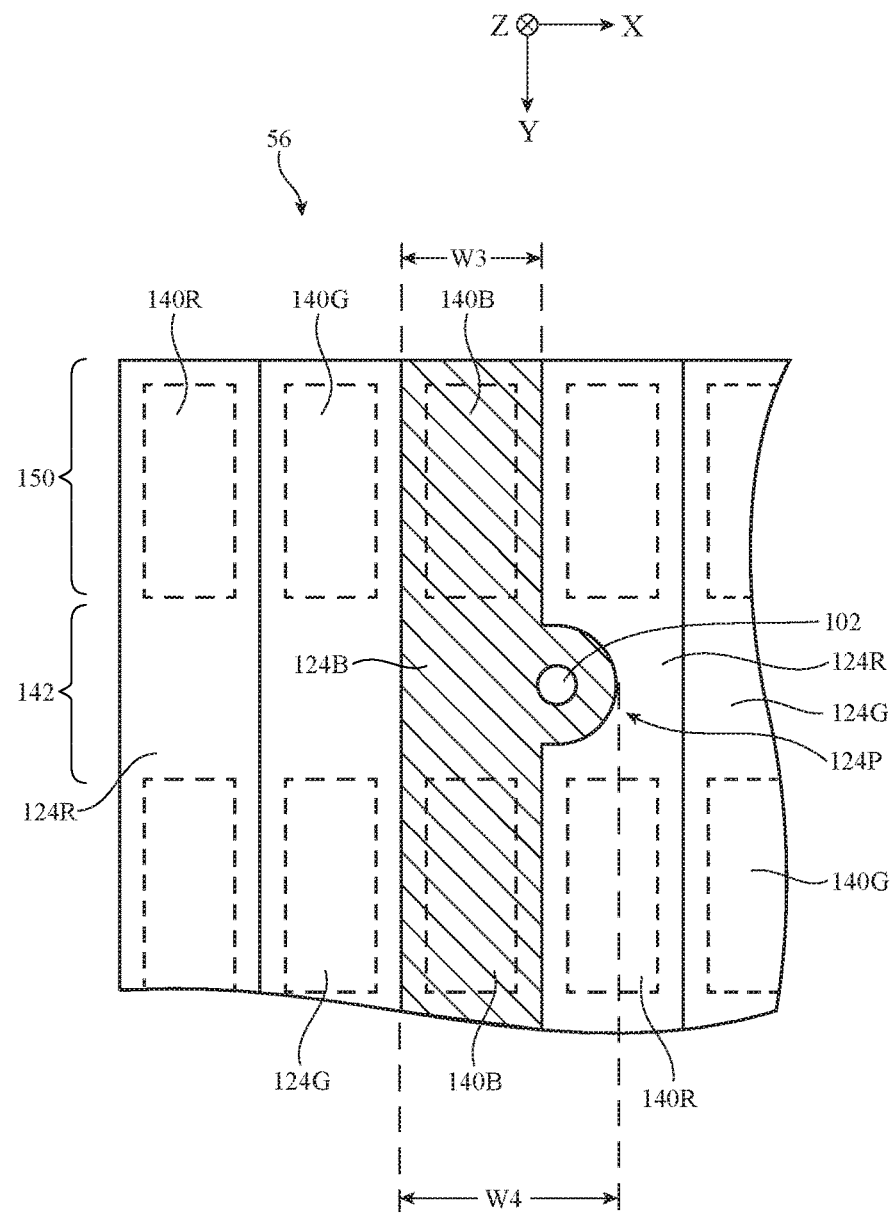
FIG. 10 is a bottom view of an illustrative color filter layer showing how column spacers may be formed on a planar surface of blue color filter material that extends onto an adjacent color filter material in accordance with an embodiment of the present invention.

FIG. 10 is a bottom view of color filter layer 56 showing an illustrative arrangement for column spacers 102. As shown in FIG. 10, red color filter material 124R, green color filter material 124G, and blue color filter material 124B form continuous vertical strips (extending parallel to the y-axis of FIG. 10) that each cover a corresponding column of display pixel regions 140. As with the example of FIGS. 7, 8, and 9, column spacers such as column spacer 102 are formed on portions of color filter layer 56 that lie outside of pixel regions 140 such as column spacer regions 142.

To ensure that column spacers 102 are formed on a flat surface without requiring a thick overcoat layer, the last color filter material to be deposited on color filter layer 56 may also be used to planarize the surface of color filter layer 56. For example, after red color filter material is deposited and patterned to form red color filter elements 124R, and after green color filter material is deposited and patterned to form green color filter elements 124G, blue color filter material may be deposited and patterned to form blue color filter elements 124B and to form extended color filter portion 124P in region 142 between rows of pixel regions 140. Column spacer 102 may be formed on extended portion 124P of blue color filter material 124B.

Protruding portion 124P of color filter material 124B may be formed by expanding the width of color filter material 124B in region 142. For example, color filter material 124B may have a width W3 in regions 150 where color filter material 124B overlaps pixel region 140B, whereas in regions 142 (between rows of pixel regions 140), color filter material 124B has a width W4 that is larger than width W3.

As shown in FIG. 10, protruding portion 124P of color filter material 124B may overlap the color filter material of an adjacent column of color filter material. For example, protruding portion 124P may overlap an adjacent column of red color filter material 124R or an adjacent column of green color filter material 124G. If desired, protruding portion 124P may extend only partially onto the adjacent color filter. For example, as shown in FIG. 10, a first portion of red color filter material 124R in region 142 is covered by protruding portion 124P, while a second portion of red color filter material 124R in region 142 remains uncovered by blue color filter material and separates protruding portion 124P from the adjacent green color filter material 124G.

By using the blue color filter material as a planarization layer, rather than using a fourth transparent material as a planarization layer, the height of the planarization layer relative to the surface of the color filter substrate may be reduced, thereby minimizing display color wash-out that can result from a thick planarization layer.

The example of FIG. 10 in which the column of blue color filter material 124B includes extending portion 124P extending from one side of color filter material 124P is merely illustrative. If desired, protruding portions may extend from both sides of a column of color filter material. This type of arrangement is illustrated in FIG. 11.

Figure 11:
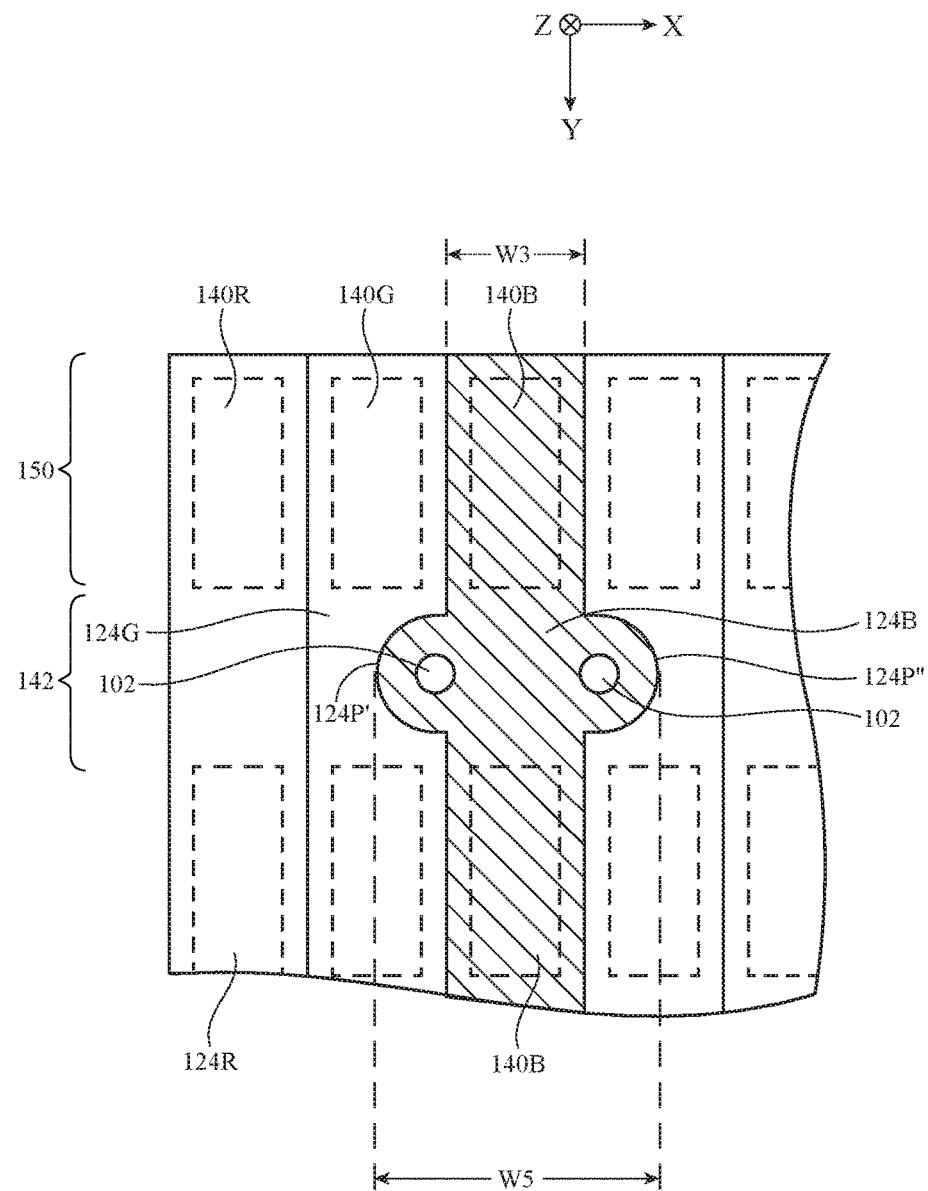
FIG. 11 is a bottom view of an illustrative color filter layer showing how column spacers may be formed on planar surfaces of blue color filter material that extend onto two adjacent color filter materials in accordance with an embodiment of the present invention.

FIG. 11 is a bottom view of color filter layer 56 showing an illustrative arrangement for column spacers 102. As shown in FIG. 11, red color filter material 124R, green color filter material 124G, and blue color filter material 124B form continuous vertical strips (extending parallel to the y-axis of FIG. 11) that each cover a corresponding column of display pixel regions 140. As with the example of FIGS. 7, 8, 9, and 10, column spacers such as column spacer 102 are formed on portions of color filter layer 56 that lie outside of pixel regions 140 such as column spacer regions 142.

To ensure that column spacers 102 are formed on a flat surface without requiring a thick overcoat layer, the last color filter material to be deposited on color filter layer 56 may also be used to planarize the surface of color filter layer 56. For example, after red color filter material is deposited and patterned to form red color filter elements 124R, and after green color filter material is deposited and patterned to form green color filter elements 124G, blue color filter material may be deposited and patterned to form blue color filter elements 124B and to form extended color filter portions 124P' and 124P''' in region 142 between rows of pixel regions 140. A first column spacer 102 may be formed on extended portion 124P' and a second column spacer 102 may be formed on extended portion 124P'''.

Protruding portions 124P' and 124P''' of color filter material 124B may be formed by expanding the width of color filter material 124B in region 142. For example, color filter material 124B may have a width W3 in regions 150 where color filter material 124B overlaps pixel region 140B, whereas in regions 142 (between rows of pixel regions 140), color filter material 124B has a width W5 that is larger than width W3.

As shown in FIG. 11, protruding portions 124P' and 124P''' of color filter material 124B may each overlap the color filter material of an adjacent column of color filter material. For example, protruding portion 124P' may overlap an adjacent column of green color filter material 124G on one side of color filter material 124B, while protruding portion 124P''' may overlap an adjacent column of red color filter material 124R on an opposing side of color filter material 124B.

By using the blue color filter material as a planarization layer, rather than using a fourth transparent material as a planarization layer, the height of the planarization layer relative to the surface of the color filter substrate may be reduced, thereby minimizing display color wash-out that can result from a thick planarization layer.

Figure 12:
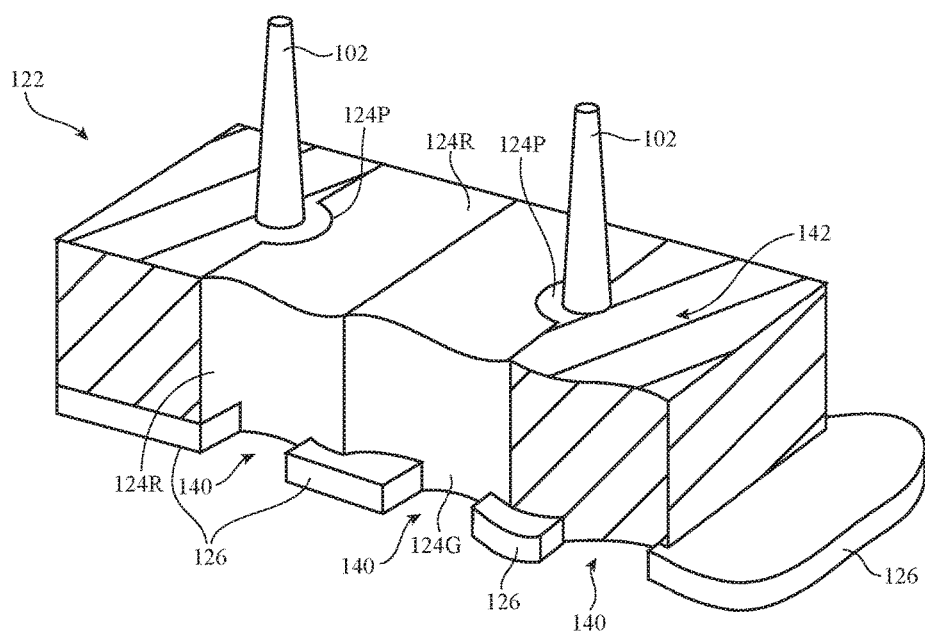
FIG. 12 is a perspective view of a portion of a color filter array in which blue color filter material that extends onto an adjacent color filter material forms a planar surface to accommodate column spacers in between rows of light-transmitting regions in accordance with an embodiment of the present invention.

FIG. 12 is a perspective view of a portion of color filter array 122 with a column spacer arrangement of the type shown in FIGS. 10 and 11. As shown in FIG. 12, opaque masking material 126 may have an array of openings, each corresponding to a respective pixel region 140 through which light is transmitted. Light may travel in direction Z through a respective one of color filter elements 124R, 124G, and 124B before passing through pixel regions 140 to exit the display.

In regions 142 between rows of pixel regions 140, lines of opaque masking material 126 may be used to hide control lines and thin-film transistor circuitry on thin-film transistor layer 58 (FIG. 8) from view. Because light is not transmitted through the opaque masking material in regions 142, regions 142 provide acceptable locations on which to form column spacers 102.

To provide a planar surface for column spacers 102 in regions 142 without requiring a thick overcoat layer (e.g., without requiring overcoat layer 128 of FIG. 8 to be excessively thick), blue color filter material 124B may have protruding portion 124P that extends onto an adjacent color filter and that forms a flat surface on which column spacer 102 can be formed (e.g., a surface that is parallel or substantially parallel to the surface of color filter substrate 120 of FIG. 8).

As shown in FIG. 12, column spacers 102 may be formed in locations that overlap a boundary or interface between two color filter elements (e.g., column spacers 102 may have one portion overlapping a first color filter element and a second portion overlapping a second color filter element). Forming column spacer 102 over a boundary between two adjacent color filter elements may ensure that the widened portions of blue color filter material do not overlap light-transmitting regions 140.

Figure 13:
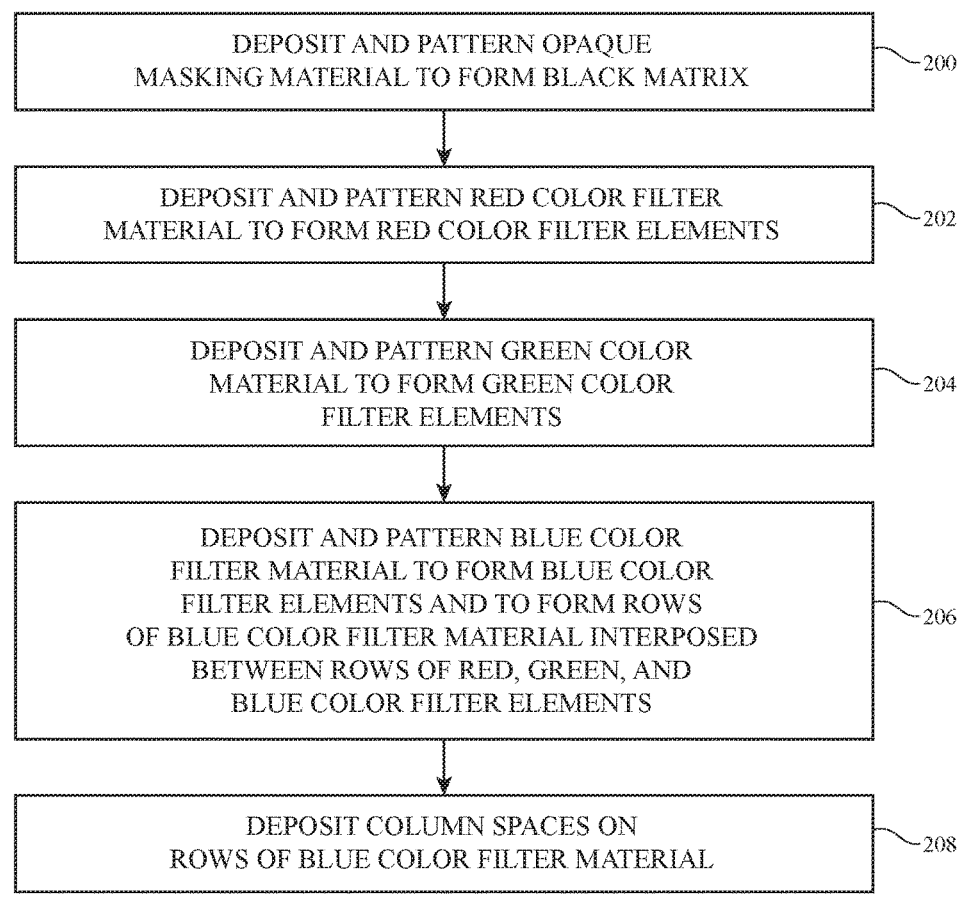
FIG. 13 is a flow chart of illustrative steps involved in forming a color filter array of the type shown in FIG. 9 in accordance with an embodiment of the present invention.

FIG. 13 is a flow chart of illustrative steps involved in forming a color filter array and column spacer array on a color filter layer.

At step 200, a layer of opaque masking material may be deposited and patterned on a color filter substrate such as color filter substrate 120 of FIG. 8. This may include, for example, using photolithographic fabrication techniques to form a grid of crisscrossing opaque lines having openings through which display light may exit display 14. The grid of crisscrossing lines may, for example, be formed from black photoresist material and may sometimes be referred to as a black matrix.

At step 202, a layer of red color filter material may be deposited and patterned on the color filter substrate. This may include depositing a layer of red photoresist over the black matrix and subsequently patterning the layer of red photoresist using photolithography techniques to form an array of red color filter elements. Each red color element may cover a respective one of the openings in the black matrix formed in step 200.

At step 204, a layer of green color filter material may be deposited and patterned on the color filter substrate. This may include depositing a layer of green photoresist over the black matrix and the red color filter elements. The layer of green photoresist may subsequently be patterned using photolithography techniques to form an array of green color filter elements. Each green color element may cover a respective one of the openings in the black matrix formed in step 200.

At step 206, a layer of blue color filter material may be deposited and patterned on the color filter substrate. This may include depositing a layer of blue photoresist over the black matrix, the red color filter elements, and the green color filter elements. The layer of blue photoresist may subsequently be patterned using photolithography techniques to form an array of blue color filter elements. Each blue color element may cover a respective one of the openings in the black matrix formed in step 200. During the depositing step, the blue color filter material may be deposited to form a planar surface over portions of red and green color filter material. During the patterning step, portions of the blue color filter material may be patterned to form single-color rows of blue color filter material in between rows of red, green, and blue color filter elements. The rows of blue color filter material may, for example, be located in regions 142 of FIG. 7. The rows of blue color filter material may form a planar surface and may, if desired, have varying widths (e.g., as shown in FIG. 9) to accommodate column spacers 102.

At step 208, column spacers 102 may be deposited on the rows of blue color filter material in regions 142 formed in step 206. This may include, for example, using photolithographic fabrication techniques to form an array of photoresist pillars. If desired, column spacers may be formed form other polymers or may be formed from non-polymers.

If desired, a transparent overcoat layer may be formed over the red, green, and blue color filter material prior to forming photoresist pillars in step 208. Because the surface of the color filter array in column spacer regions 142 is already planarized by blue color filter material in step 206, the thickness of the transparent overcoat layer may be minimized.

The examples of FIGS. 7-10 in which blue color filter material is used to planarize the surface of color filter array 122 is merely illustrative. If desired, any other suitable color filter material may be used to planarize the surface of color filter array 122 in region 142. For example, red color filter material 124R may be used to form red color filter elements and may be deposited over green and blue color filter material to form a planar surface of red color filter material in column spacer regions 142. If desired, green color filter material may be used to form green color filter elements and may be deposited over red and blue color filter material to form a planar surface of green color filter material in column spacer regions 142.

The foregoing is merely illustrative of the principles of this invention and various modifications can be made by those skilled in the art without departing from the scope and spirit of the invention.

What is claimed is:

1. A display, comprising:
   a color filter substrate;
   a color filter array formed on the color filter substrate, wherein the color filter array comprises rows of color filter elements and wherein each row of color filter elements includes red color filter elements, green color filter elements, and blue color filter elements;
   blue color filter material interposed between the rows of color filter elements, wherein the blue color filter material forms a plurality of planar surfaces between the rows of color filter elements, wherein the planar surfaces are separated from one another by gaps in the blue color filter material, and wherein each planar surface extends partially over adjacent color filter material of a different color; and
   a column spacer formed on each planar surface.

2. The display defined in claim 1 further comprising:
   a thin-film transistor layer having an upper surface; and
   a liquid crystal layer between the color filter array and the upper surface, wherein the column spacers are located between the color filter array and the upper surface.

3. The display defined in claim 1 further comprising a grid of opaque masking lines formed on the color filter substrate, wherein the grid of opaque masking lines comprises a plurality of openings, wherein each color filter element in the color filter array overlaps a corresponding one of the openings.

4. The display defined in claim 3 wherein the blue color filter material overlaps the opaque masking lines between the rows of color filter elements.

5. The display defined in claim 3 wherein each color filter element in the color filter array is separated from each neighboring color filter element in the color filter array by a boundary and wherein each of the column spacers is formed on a portion of the blue color filter material that overlaps the boundary.

6. The display defined in claim 1 wherein the plurality of column spacers comprises main column spacers having a first thickness and subspacer column spacers having a second thickness, and wherein the first thickness is greater than the second thickness.

7. A display, comprising:
   a color filter substrate;
   a color filter array formed on the color filter substrate, wherein the color filter array comprises rows of light-transmitting regions through which light exits the display, wherein the rows of light-transmitting regions are separated from each other by light-blocking regions, wherein the color filter array comprises color filter material of at least first and second colors in each light-blocking region, and wherein the color filter material of the first color has an extended portion that partially overlaps the color filter material of the second color in each light blocking region; and
   a plurality of column spacers, wherein one of the column spacers is formed on the extended portion.

8. The display defined in claim 7 wherein the color filter array comprises red, green, and blue color filter elements and wherein each of the red, green, and blue color filter elements overlaps a respective one of the light-transmitting regions.

9. The display defined in claim 7 wherein the column spacers comprise pillars of photoresist.

10. The display defined in claim 7 further comprising:
    a thin-film transistor layer; and
    a layer of liquid crystal material between the color filter array and the thin-film transistor layer, wherein the column spacers are located between the color filter array and the thin-film transistor layer.

11. The display defined in claim 7 further comprising a black matrix formed on the color filter substrate, wherein the black matrix comprises lines of opaque masking material in the light-blocking regions.

12. The display defined in claim 11 wherein the first color comprises blue and the second color comprises red.

13. A method, comprising:
    depositing and patterning red color filter material on a color filter substrate of a display to form red color filter elements;
    depositing and patterning green color filter material on the color filter substrate of the display to form green color filter elements; and
    depositing and patterning blue color filter material on the color filter substrate of the display to form blue color filter elements, wherein depositing and patterning the blue color filter material comprises forming the blue color filter material over the red and green color filter elements to form planar surfaces over the red and green color filter elements with the blue color filter material, and wherein each planar surface extends partially over adjacent color filter material of a different color, and wherein the planar surfaces that extends partially are separated from one another by gaps in the blue color filter material.

14. The method defined in claim 13 further comprising:
    forming a plurality of column spacers on the planar surfaces formed by the blue color filter material.

15. The method defined in claim 14 wherein forming the plurality of column spacers comprises forming pillars of photoresist.

16. The method defined in claim 14 further comprising:
    depositing and patterning an opaque masking material on the color filter substrate.

17. The method defined in claim 14 further comprising:
    depositing a transparent overcoat material over the red, green, and blue color filter elements.

* * * * *